United States Patent [19]

Fini, Jr.

[11] 4,114,476
[45] Sep. 19, 1978

[54] AUTOMATIC TORQUE STICK TRANSMISSION

[76] Inventor: Anthony W. Fini, Jr., 4273 Mundy St., Blasdell, N.Y. 14219

[21] Appl. No.: 705,395

[22] Filed: Jul. 15, 1976

[51] Int. Cl.² .......................... F16H 3/02; B60K 1/00; B60K 9/00
[52] U.S. Cl. .................................. 74/745; 180/64 R; 180/70 R; 74/230.17 E
[58] Field of Search ................ 74/745, 740, 722, 701, 74/700, 689, 230.17 E, 230.17 M; 180/70 R, 64 R, 57

[56] References Cited

U.S. PATENT DOCUMENTS

| 1,230,896 | 6/1917 | Haupt | 180/70 R |
|---|---|---|---|
| 2,150,456 | 3/1939 | Perrine | 74/230.17 E |
| 2,585,732 | 2/1952 | Braman | 74/230.17 E |
| 2,709,327 | 5/1955 | Heth | 180/70 R |
| 2,841,021 | 7/1958 | Steibel | 74/230.17 E |
| 3,442,346 | 5/1969 | Winter et al. | 180/70 R X |
| 3,625,079 | 12/1971 | Hoff | 74/230.17 E |
| 3,752,014 | 8/1973 | Holtan | 74/745 |
| 3,902,565 | 9/1975 | Farrall | 180/65 R |
| 3,926,020 | 12/1975 | Dantowitz et al. | 74/217 B |

FOREIGN PATENT DOCUMENTS

| 1,286,412 | 1/1969 | Fed. Rep. of Germany | 74/745 |
|---|---|---|---|
| 142,174 | 9/1953 | Sweden | 74/745 |

*Primary Examiner*—Samuel Scott
*Assistant Examiner*—Carl F. Pietruszka

[57] ABSTRACT

A variable speed semi-automatic transmission system is adapted for use in maximizing vehicle speed and torque output obtainable from a small or low horsepower engine. The system includes in combination a belt type torque converter properly matched with the engine, a transmission having at least two forward speeds, and an over-riding clutch employed to selectively couple the torque converter with the transmission.

4 Claims, 3 Drawing Figures

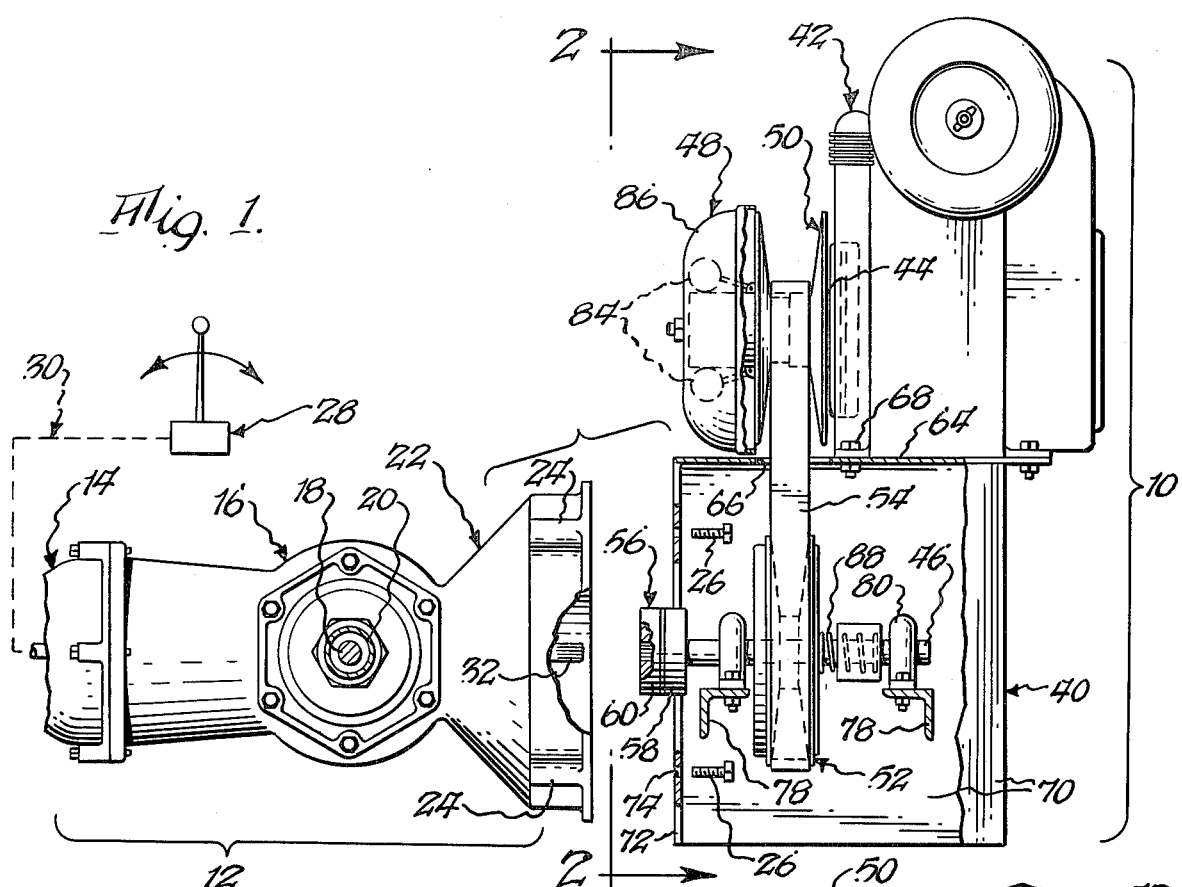
Fig. 1.
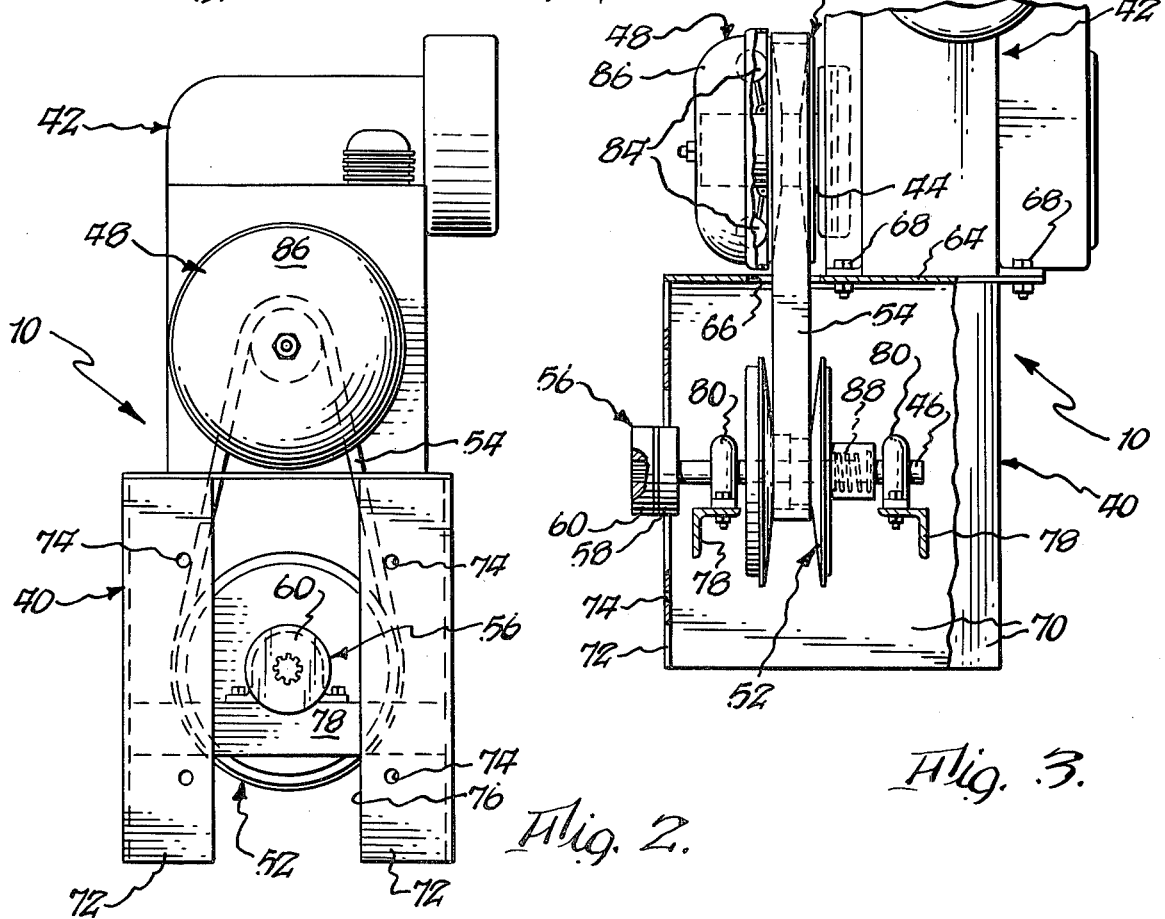
Fig. 2.
Fig. 3.

AUTOMATIC TORQUE STICK TRANSMISSION

BACKGROUND OF THE INVENTION

Over the past several years, it has become increasingly common to convert a used Volkswagon or VW "Bug" into an antique car, a sports car, a dune buggy etc. by replacing the rusted or otherwise damaged VW body with a conversion body commercially available in kit form. Normally, the frame and working parts of the VW including engine, transmission, differential, brake, steering linkage etc. are retained, since the primary intent of these conversions is to change the outward appearance and to possibly reduce the weight of the original VW in order to minimize gas consumption and/or maximize the vehicle speed obtainable with the original VW engine.

Further, over the years, belt type torque converters have been employed to couple an engine directly to a traction mechanism of the vehicle, as evidenced for instance by U.S. Pat. Nos. 3,599,504 and 3,680,403, or indirectly thereto via a directional control transmission, as evidenced for instance by U.S. Pat. Nos. 2,150,456; 2,256,699; 3,401,582 and 3,939,732. It is also well known to provide speed responsive or over-riding clutch devices to facilitate changing of multiple forward gears incident to release of an accelerator pedal; and to provide an automatic clutch in the form of a fluid coupling device in combination with a belt type torque converter in order to improve the torque conversion characteristics of such converter, as evidenced by U.S. Pat. No. 3,173,311.

SUMMARY OF THE INVENTION

The present invention is directed towards an improved vehicle transmission system particularly adapted for use in maximizing vehicle speed and torque output obtainable from small or low horsepower engines.

The present invention broadly contemplates the utilization of a belt-type torque converter, which is properly matched to the operating characteristics of a small engine in combination with a multi-forward speed manual transmission, and if required, an over-riding clutch in order to maximize the vehicle speed and torque output of such engine. In permitting use of a small engine, the present system realizes vehicle weight advantages and provides for improved gas consumption, without serious reduction in vehicle speed/acceleration performance.

As by way of specific illustration, the present invention is disclosed as being employed incident to the conversion of a used VW "Bug" to permit a standard 12 hp lawn or garden type tractor engine to be substituted for a standard VW engine. The resultant or converted vehicle has a gross weight on the order to about 1000 pounds, is capable of highway speed/acceleration operating conditions and has an expected gas consumption of between about 50–60 mpg.

While the present invention was developed principally for use in the conversion of a used VW, it will be appreciated that it is not limited thereto. In this connection, it is specifically anticipated that the present transmission system may be employed in diverse types of land/water vehicles to permit utilization of an engine, whose output would otherwise be insufficient to power such vehicle within its normal speed/acceleration operating range.

DRAWINGS

The nature and mode of operation of the present invention will now be more fully described in the following detailed description taken with the accompanying drawings wherein:

FIG. 1 is an exploded side elevational view illustrating a preferred form of the transmission system of the present invention, with parts broken away for purposes of clarity;

FIG. 2 is a view taken generally along the line 2—2 in FIG. 1; and

FIG. 3 is a side elevational view of the motor transmission conversion assembly shown in FIG. 1, but illustrating a different operating condition.

DETAILED DESCRIPTION

To facilitate understanding of the present invention, it will be described with particular reference to its use in the conversion of a used Volkswagon "Bug" type vehicle (hereinafter referred to as "VW"). More specifically, it is contemplated that, in accordance with a preferred form of the present invention, a motor-transmission conversion assembly, which is designated as 10 in the drawings, be mounted on a standard VW transaxle assembly 12 in place of a standard VW engine-clutch assembly, not shown, with a view towards obtaining overall vehicle weight reduction and substantial improvement in gas consumption without producing adverse effect on allowable vehicle acceleration/highway speed performance characteristics.

It will be understood that a standard VW transaxle assembly includes a forwardly disposed transmission section 14, which serves to enclose a standard, multiple-forward speed synchromesh type transmission, not shown; an intermediate or differential section 16, which serves to enclose a standard differential drivingly connected to traction means, such as a pair of wheels by a pair of horizontally oppositely extending drive shafts 18 housed within a rear axle casing 20; and a rearwardly opening clutch-mounting section 22, which is formed with a plurality of bosses 24 threaded to removably receive mounting bolts 26 by which the standard VW engine-clutch assembly is normally fixed to the transaxle assembly, control of the transmission may be effected by a standard multiple-forward speed stick or comparable manual shift 28, which may be suitably connected to the transmission by control linkage 30. Further, the transmission is shown as being provided with a suitable drive linkage, which extends rearwardly through the differential and terminates at its rear end in a splined shaft 32 arranged within section 22.

Assembly 10 generally comprises a mounting framework 40; a standard gasoline powered engine 42 having an output or drive shaft 44; a journaled shaft 46; a standard belt-type torque converter 48 having an expansible drive pulley 50 fixed for rotation with drive shaft 44, an expansible driven pulley 52 fixed for rotation with shaft 46 and a generally V-shaped drive belt 54 trained about pulleys 50 and 52; and a standard automatic overrunning clutch, hereinafter referred to as over-riding clutch 56 the clutch 56 has an input portion 58 fixed for rotation with shaft 46 and an output portion 60, which is adapted to be fixed for rotation with splined shaft 32 and releasably coupled for conjunctive rotation with input portion 58.

Framework 40 is shown in the drawings as being of a box-like welded metal construction and as generally including a top wall 64 having a clearance opening(s) 66 for freely receiving drive belt 54 and a plurality of mounting openings, not shown, sized to receive engine mounting bolt devices 68; a pair of side walls 70; a pair of relatively spaced front walls or mounting flanges 72, which are formed with first openings in the form of apertures 74 sized to receive mounting bolts 26 and cooperate to define centrally located second opening 76; and a pair of angle irons 78, which serve to internally brace side walls 70 and to mount a pair of suitable bearing devices 80, which in turn serve to journal shaft 48 such that the latter is arranged in a vertically spaced parallel relationship relative to drive shaft 44 and in alignment with opening 76. Apertures 74 are arranged such as to effect alignment of shaft 48 and clutch 56 with splined shaft 32 when assembly 10 is mounted on clutch-mounting section 22 by means of bolts 26.

Engine 42 is preferably an air cooled gasoline engine of the type marketed under the brand names Briggs and Stratton, Tecumseh and Kohler for use in powering power lawn and garden tractors. Engines of this type normally range in horsepower from between about 8 hp and 23 hp, and have a range of idling rpm between about 1200 and 1500 rpm and produce a maximum torque output between about 2400 and 2500 rpm. This general type of engine has been found desirable for use in the present system, due to its rugged/light weight construction and its economical operation. The choice of engine size or horsepower output rating will depend primarily upon the weight and desired performance and gas consumption characteristics of the vehicle to be powered.

Converter 48 may be selected from many commercially available models, but for purposes of reference, it is depicted as being of the type having swingable centrifugal weights 84, which are housed within a casing 86 and serve to effect axial contraction of drive pulley 50, as an incident to increase in the rotation speed of drive shaft 44; and a coil type spring device 88, which tends to resist axial expansion of driven pulley 52. For purposes of reference, the operating conditions of converter 48 corresponding to low and high rpm operating conditions of engine 42 are shown in FIGS. 1 and 3, respectively.

In Accordance with the present invention, the range of operation of converter 48 must be matched with engine 42 to insure that it engages, ie. initiates a change of the speed ratio of driven pulley 52 to drive pulley 50, at an rpm, which is preferably slightly in excess of the range of engine idling rpm, and that it achieves its maximum output at an rpm essentially corresponding to the maximum torque output rpm of the engine. Matching of converter 48 with engine 42 in this manner serves to maximize the speed and acceleration characteristics of a vehicle obtainable with any given size engine.

Over-riding clutch 56 is preferably employed in the present system in that it permits semi-automatic operation of the system, ie. permits changing of gears immediately upon release of the engine accelerator pedal, without need for providing a conventional manually operated clutch. Absent the provision of clutch 56, a lapse of several seconds would normally be required between release of the accelerator pedal and initiation of a gear shifting operation in order to prevent possible damage to the vehicle transmission. The specific design of clutch 56 is not critical to the practice of the present invention, providing that it is capable of automatically releasing the driving connection with, ie. permitting free wheeling of, an associated trailing element of the system power train upon a substantial decline of input rpm thereto occasioned by deceleration of engine 42. Preferably, clutch 56 would be chosen to allow a difference between declined input rpm and trailing element rpm equal to or greater than the difference between such input rpm occasioned by an engine idling condition and the maximum driven rpm of such trailing element. Further, while clutch 56 is shown in the drawings as being located in a trailing relationship relative to converter 48, it will be understood that the clutch may be arranged intermediate the converter and engine 42. While the latter arrangement would permit the utilization of a relatively smaller and lighter-weight clutch assembly, it would have the disadvantage of requiring modification/extension of drive shaft 44 to accommodate the clutch and/or a separate bearing support for converter drive pulley 50.

As by way of specific example, a conversion assembly formed in accordance with the present invention was mounted on the transaxle assembly of a used VW from which the body has been removed to provide a prototype or test road vehicle having a weight on the order of 1,000 pounds. The VW transaxle assembly incorporates a four forward speed manual shift, syncromesh type transmission with gear ratios in first gear of 3:80–1, in second gear of 2:06–1, in third gear of 1:32–1, in fourth gear of 0:89–1 and in reverse gear of 3:88–1. The VW differential was rated as having a 4:375–1 ratio (axle to engine) in fourth gear.

The conversion assembly included a 12 hp air cooled internal combustion engine having a range of idling rpm of between about 1200 and 1500 rpm; a maximum torque output of approximately 25 ft-lbs. of between about 2400 and 2500 rpm; and a rated output of 12 hp at a governed top speed of 3600 rpm. The converter employed was designed to engage at a 4:1 ratio (between driven and driver pulleys) at 1600 input rpm and reach a maximum output at a 1:2 ratio (between driven and driver pulleys) at 2500 input rpm. The over-riding clutch was chosen to allow a three thousand (3,000) rpm difference between declined engine speed and power train continuation speed.

The prototype vehicle was found to possess extremely good to adequate acceleration characteristics throughout its speed operating range with a top speed of between 55 and 60 mph.

It has been determined that for a one thousand pound vehicle incorporating the present system, engines smaller than about 12 hp will not possess sufficient power to provide desired road speed/acceleration characteristics. While it would of course be possible to employ engines larger than 12 hp in order to obtain improvements in these characteristics, there would, however, be a corresponding reduction in economy of operation.

Further, it has been determined that either conventional three or four speed syncromesh transmissions are adapted for use in the present system providing that they possess gear ratios ranging from about 4:1 to 1:1. Transmissions having less than three speeds would result in an unacceptable decrease in performance, whereas the provision of an additional gear, as in a five speed transmission, would not appear to provide any appreciable improvement in operation or economy.

Lastly, it has been determined that the presently disclosed system when used in a road vehicle of the type described would preferably employ a differential having a gear ratio between about 3:1 and 5:1. Gear ratios substantially less and greater than this range will result in inadequate vehicle acceleration and top speed performance, respectively.

While a preferred form of the present system has been described in detail, it will be understood that various possible modifications thereof are presently contemplated. In this respect, the presently disclosed mechanical over-riding clutch may be replaced by an electrical or fluid operated clutch responsive to operation of the engine acceleration pedal or initiation of operation of the gear shifting mechanism.

I claim:

1. A variable speed transmission system, comprising:
   a manually shiftable gear box having a plurality of synchronized forward speed gear ratios, said gear box having an input shaft;
   an overrunning clutch mounted on said input shaft for disengaging said input shaft from a vehicle engine upon deceleration of such vehicle engine;
   a second shaft connected to said overrunning clutch;
   a torque converter connecting said second shaft to a drive shaft of a vehicle engine, said torque converter including a drive pulley mounted on such vehicle engine drive shaft to be driven thereby and having a movable wall which moves to contract and open said drive pulley and centrifugal weights connected to said movable wall controlling movement of said movable wall and exerting force on said drive pulley movable wall for contracting said drive pulley as such vehicle engine speed is increased from an idling speed to maximum engine speed, said torque converter further including a driven pulley mounted on said second shaft for driving said second shaft and having a movable wall which moves to contract and open said driven pulley, and a spring mounted on said second shaft and connected to said driven pulley movable wall, said spring biasing said driven pulley movable wall in a direction to contract said driven pulley, and a V-belt connecting said drive and driven pulleys, said pulleys having walls shaped to correspond to the shape of said V-belt;
   said V-belt being mounted in said driving and driven pulleys to be selectively engaged by said drive pulley and so force said driven pulley into an open configuration against said spring bias as said drive pulley is contracted by said weights as such vehicle engine speed is increased from idling speed, said spring bias being matched to the force exerted on said drive pulley movable wall by said weights so that said drive pulley and said driven pulley movable walls move synchronously and so that the drive pulley is fully contracted and said driven pulley is fully open at maximum engine speed, and vice versa at engine idling speed;
   said overrunning clutch being interposed between said gear box input shaft and said second shaft so that at each gear change upon deceleration of such vehicle engine, said second shaft is disengaged from said gear box input shaft with said weights relaxing the force exerted on said drive pulley movable wall and said spring bias moving said driven pulley movable wall to fully close said driven pulley, said belt forcing said drive pulley fully open whereby after each gear change said drive pulley is fully open and said driven pulley is fully contracted so that torque transmitted to said gear box from an engine via said torque converter is maximized, said pulley movable walls moving synchronously as such engine accelerates and decelerates with said drive pulley being fully open when said driven pulley is fully contracted and vice versa whereby full use is made of available torque output from a vehicle engine in each forward speed gear of said gear box.

2. A mechanical power transmission device, as specified in claim 1, with spring tension of the spring on the driven pulley being adjusted to overcome the centrifugally forced expansion of the driver pulley, so that gear changes in the manual shift gearbox can be made immediately upon power source deceleration without a loss of output speed from the gearbox.

3. A system according to claim 1, wherein said clutch means is an over clutch automatically releasable from driving connection with said gear box input shaft upon substantial decline of input rpm thereto, said clutch allowing a difference between declined input rpm and gear box input shaft rpm equal to or greater than the difference between said input rpm thereto occasioned by an engine idling condition and the maximum driven rpm of said gear box input shaft.

4. A system according to claim 1, wherein said engine is of between about 8 and 23 hp, said idling rpm is between about 1200 and 1500 rpm, and said engine has a maximum torque output rpm of between about 2400 and 2500 rpm.

* * * * *